United States Patent Office 3,592,830
Patented July 13, 1971

3,592,830
ALKYLENEDIAMINE DERIVATIVES
CONTAINING CARBOHYDRATES
Nasser, Israily, 8 Browne St., Brookline, Mass. 02146
No Drawing. Continuation-in-part of application Ser. No.
697,299, Jan. 13, 1968. This application May 22, 1970,
Ser. No. 39,908
Int. Cl. C07f 15/02; C07c 101/02
U.S. Cl. 260—439                                10 Claims

ABSTRACT OF THE DISCLOSURE

This invention relates to chelating agents that are the reaction products of an alkylenediamine such as ethylenediamine or propylenediamine and an aldo or keto carbohydrate. To form the chelating agent of the invention, the diamine is first reacted with hydrogen cyanide and subsequently either hydrolyzed or substituted with side chains and then hydrolyzed. The compounds of the invention form stable chelates with metal ions including iron over a wide range of pH.

CROSS-REFERENCE TO RELATED APPLICATIONS

This application is a continuation-in-part of copending U.S. application Ser. No. 697,299 filed Jan. 13, 1968, now abandoned.

BACKGROUND OF THE INVENTION

(1) Field of the invention

This invention relates to the preparation of chelating agents and more particularly, to the formation of chelating agents that are the reaction product of an alkylenediamine and an aldo or keto carbohydrate.

(2) Description of the prior art

Chelating agents are known in the art and have established utility for many commercial applications. The most widely used chelating agent is ethylenediaminetetraacetic acid (herein referred to as E.D.T.A.). It is known in the art to use the metal chelates of E.D.T.A. for example, as well as other chelating agent for correction of metal deficiency anemia occurring in plants, fruit trees and mammals. In this respect, the iron chelate or E.D.T.A. has been used to treat iron deficiency anemia occurring in citrus grown on acid soil. Other uses for such chelating agents include the inhibition of metal ion discoloration in processes such as textile dying, printing and papermaking as well as the control of metal ions in polymerization reactions. Further, they have been used for control of calcium precipitation in various types of aqueous media. Many of the known chelating agents are useful only within a limited range of pH. For example, as noted above, the iron chelate of E.D.T.A. has been used to treat iron deficiency occurring in citrus grown acid soil. However, it is known that this chelate is unstable in neutral and weakly alkaline solution with decomposition occurring to yield ferric hydroxide and a soluble salt of E.D.T.A. Consequently, the chelate cannot be used with great success for correction of metal deficiencies occurring in plants growing in alkaline soil.

Other chelating agents are available which find use over a wider range of pH, but these agents are frequently derived from relatively costly starting materials and consequently, the chelating agents formed therefrom are also costly.

STATEMENT OF THE INVENTION

The present invention provides chelating agents that are stable over a wide range of pH, that are made from relatively inexpensive "by-product" materials and which are relatively inexpensive to make.

The chelating agents of the invention are the reaction products of an alkylenediamine such as ethylenediamine or propylenediamine and an aldo or keto carbohydrate. They are formed by reacting the diamine with hydrogen cyanide and subsequently either hydrolyzing the product formed or substituting the same with side chain substituents and then hydrolyzing the product.

DESCRIPTION OF THE PREFERRED EMBODIMENTS

The chelating agents of this invention can be represented by the following structural formula:

$$HOCH_2-(CHOH)_n-\underset{\underset{COOM}{|}}{\overset{R'}{\underset{|}{C}}}-\left(\underset{|}{\overset{R}{N}}-Z\right)_x-\underset{\underset{COOM}{|}}{\overset{R}{\underset{|}{N}}}-\overset{R'}{\underset{|}{C}}(CHOH)_n-CH_2OH$$

where R is H, $CH_2-COOH$, $CH_2-COOM$, or $$(CH_2)_2-OH$$

R′ is H or $-CH_2OH$, Z is either $(CH_2)_2$, $(CH_2)_3$, $-CH(CH_3)$ $CH_2$, or $CH_2-CHOH-CH_2$; $n$ is 0 to 4, $x$ is 1 to 3, and M is H, Na, K or an ammonia derivative.

Compounds corresponding to the above general formula may be formed by condensing an aldo or keto carbohydrate such as aldohexose or ketohexose with an alkylenediamine such as ethylenediamine or propylenediamine to thereby substitute carbohydrate groupings on the diamine. The product of the reaction may then be reacted with hydrogen cyanide to add cyano groups. These may be either hydrolyzed to the carboxyl groups or reacted further to obtain substitution on the nitrogen atoms before hydrolysis. Such substitution can be accomplished by reaction with a mixture of hydrogen cyanide and formaldehyde or with ethylene oxide.

The process of the invention will become more readily apparent from the following examples set forth for purposes of illustration only.

Example I.—Two moles of an aldohexose of the formula

I)
$$HOCH_2-(CHOH)_4-\overset{O}{\overset{\|}{C}}H$$

were mixed with 800 cc. of ethanol and thereafter, 1 mole of ethylenediamine was slowly added. The mixture was heated gently until all of the aldohexose was dissolved. A product corresponding to the following formula was obtained:

(II)   $HOCH_2(CHOH)_4-CH=N-CH_2-CH_2-$
                            $N=CH-(CHOH)_4-CH_2OH$

Following heating, the mixture was cooled to 20° C. and 2.5 moles of liquid hydrogen cyanide slowly added. The mixture was stirred for two hours and allowed to stand at room temperature overnight. Solids were filtered off and washed with cold ethanol. The product formed corresponds to the following formula:

(III)
$$HOCH_2-(CHOH)_4-\underset{\underset{CN}{|}}{CH}-NH-CH_2-CH_2NH-\underset{\underset{CN}{|}}{CH}-(CHOH)_4-CH_2OH$$

Product (III) was hydrolyzed by two alternative methods:
(a) 5 grams of (III) were added portion-wise to 20 cc. of concentrated hydrochloric acid with stirring. The mixture was heated at a temperature of between 35° to 40° C. until all solids were dissolved. Upon cooling, the dihydrochloride of the following product was obtained.

(IV)
$$HOCH_2-(CHOH)_4-\underset{\underset{COOH}{|}}{CH}-NH-CH_2-CH_2-NH-\underset{\underset{COOH}{|}}{CH}-(CHOH)_4-CH_2OH$$

(b) 5 grams of (II) were mixed with 20 cc. of concentrated (4 N) hydrochloric acid. The mixture was refluxed at a temperature varying between 80° and 100° C. for twenty-four hours. The solution was cooled at room temperature and the pH adjusted with sodium hydroxide to about pH 5. A compound corresponding to (IV) above was obtained.

Example 2.—The iron chelate of the free acid (IV) of Example 1 was formed by mixing 1.2 grams of the acid with 25 ml. of water and adding one gram of ferric nitrate. The pH of the mixture was adjusted to about 5 with sodium hydroxide to obtain the iron chelate.

Other metal chelates can be formed by coordinating the free acid (IV) with other metal ions usch as calcium, copper, nickel, cadmium and the like.

Example 3.—One mole of the compound corresponding to Formula III above was mixed with 500 ml. of water. The mixture was maintained at 30° C. and 2.5 moles of liquid hydrogen cyanide were added with stirring. Thereafter, 2.30 moles of a 37% formaldehyde were gradually added with temperature maintained constant at about 50° C. The mixture was filtered and a residue corresponding to the formula recovered:

(V)

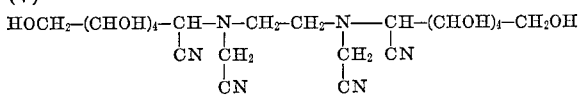

This material was hydrolyzed by two alternative procedures.

(a) 5 grams of compound (V) were mixed with 20 ml. of concentrated (4 N) hydrochloric acid with stirring. The mixture was refluxed for 24 hours. After cooling the solution to room temperature, pH was adjusted to between 0.75 and 2.0. The following free acid precipitated out of solution:

(VI)

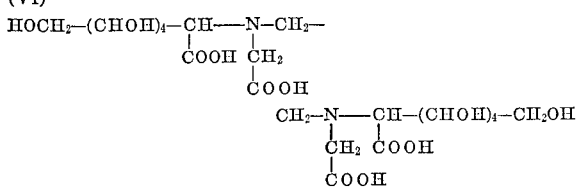

(b) Two grams of sodium hydroxide were dissolved in 60 ml. of water and 6 grams of compound (V) were added with stirring. The mixture was refluxed at a temperature of between 60° and 90° C. for about 20 to 24 hours. The solution was cooled to room temperature and pH adjusted with hydrchloric acid to about 9.5. The tetrasodium salt was obtained. Upon acidifying to pH of between about 7.5 and 2, the free acid (VI) was precipitated.

Example 4.—The iron chelate of the product of Example 3 was formed by mixing 1.40 grams of the chelating agent (VI) with 25 ml. of water and 1 gram of ferric nitrate. The pH of the mixture was adjusted to about 8 to obtain the iron chelate. The free acid (VI) may also be coordinated with other metal ions to form their corresponding metal chelates such as those listed in Example 2.

Example 5.—One mole of compound (III) described above was refluxed with 3 moles of ethylene oxide in 80 ml. of ethanol at a temperature of between about 40° C. to 60° C. for three hours. A compound corresponding to the following formula was obtained:

(VII)

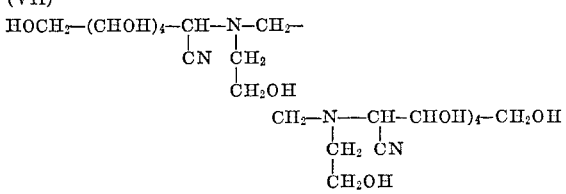

This material may be hydrolyzed in an acid medium or a basic medium as in Examples 1 and 3 to obtain the following acid:

(VIII)

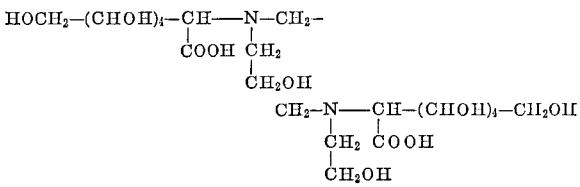

Example 6.—The procedures of Examples 1, 3, and 5 were repeated substituting 1,2-propylenediamine and 1,3-propylenediamine for ethylenediamine.

Example 7.—The procedure of Examples 1, 3, and 5 were repeated with the substitution of 1,2-phenylenediamine and 1,2-diaminocyclohexane for ethylenediamine.

Example 8.—The procedure of Examples 1, 3, and 5 were repeated substituting in place of (I) above, the following compound:

(IX)

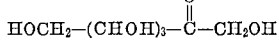

Example 9.—The procedure of Examples 1, 3 and 5 are repeated substituting for (I) above, the compound corresponding to the formula:

(X)

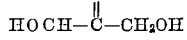

Example 10.—The procedure of Example 1 was repeated substituting diethylenetriamine for ethylenediamine to form the analogous diethylenetriamine compounds.

Example 11.—The following compound was prepared by two alternative methods:

(XI)

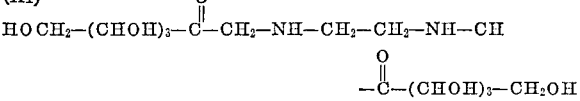

(a) Two moles of compound (I) above were dissolved in 500 ml. of water and one mole ethylenediamine. The mixture was heated gently at about 50° C. for 8 to 10 hours to form a compound (XI) described above.

(b) One mole of compound (II) described above was dissolved in 500 ml. of water and two ml. of dilute hydrochloric acid were added. The mixture was heated at a temperature of between 40° and 50° C. for one-half hour to ensure complete hydrolysis. Compound (XII) was obtained. The mixture was maintained at 20° C. and 2.5 moles of liquid hydrogen cyanide were added. Then, 2.10 moles of a 37% formaldehyde solution were gradually added over a period of two hours. The reaction is exothermic and the temperature is preferably maintained at 20° C. When all the formaldehyde is added, the mixture is maintained at room temperature for a period of from 5 to 10 hours and then heated at a temperature of about 40° to 50° C. for ½ hour. The following compound is formed:

(XII)

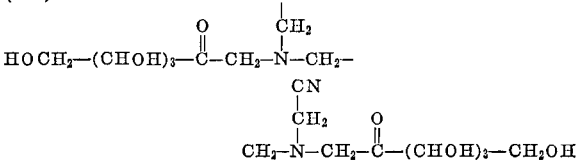

The solution is filtered and the residue (XII) washed with cold ethanol. This compound is hydrolyzed using the procedure of Example 3 to form the following compound:

(XIII)
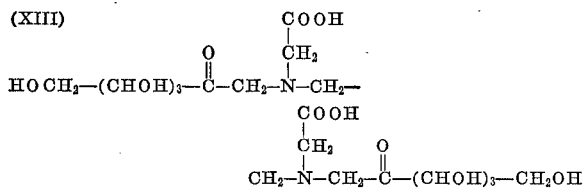

Example 12.—The procedure of Example 11 may be repeated substituting either 1,2-propylenediamine or 1,3-propylenediamine for ethylenediamine to form analogous compounds.

On the compounds of Examples 1 and 11, those identified as (II) and (XI) constitute preferred embodiments of the invention due to their large tendency to coordinate with metal ions. Their chelates are stable at both low and high pH. The ferrous chelate of compound (II) was found to be especially effective in correcting iron deficiency in plants.

I claim:
1. A compound having the general formula

$$HOCH_2-(CHOH)_n-\underset{\underset{COOM}{|}}{\overset{R'}{\underset{|}{C}}}-\left(\underset{\underset{}{|}}{\overset{R}{\underset{|}{N}}}-Z\right)_x-\underset{}{\overset{R}{\underset{|}{N}}}-\underset{\underset{COOM}{|}}{\overset{R'}{\underset{|}{C}}}-(CHOH)_n-CH_2OH$$

where R is H, $CH_2COOH$, $CH_2COOM$, or $(CH_2)OH$; R' is H or $CH_2OH$, Z is $(CH_2)_2$, $(CH_2)_3$, $CH(CH_3)CH_2$, or $CH_2$—$CHOH$—$CH_2$; $n$ is 0 to 4; $x$ is 1 to 3; and M is H, Na, or K.

2. The compound of claim 1 having the structural formula:

$$HOCH_2-(CHOH)_4-\underset{\underset{COOH}{|}}{\overset{H}{\underset{|}{C}}}-\underset{}{\overset{H}{\underset{|}{N}}}-CH_2-CH_2-\underset{}{\overset{H}{\underset{|}{N}}}-\underset{\underset{COOH}{|}}{\overset{H}{\underset{|}{C}}}-(CHOH)_4-CH_2OH$$

3. The compound of claim 1 having the structural formula:

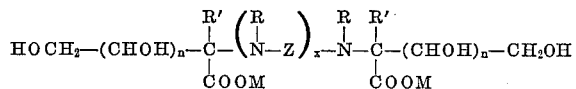

4. The compound of claim 1 having the structural formula:

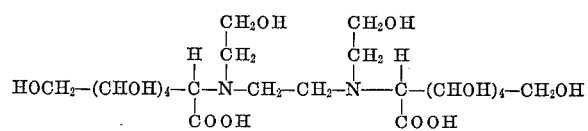

5. The compound of claim 1 having the structural formula:

$$HOCH_2-(CHOH)_3-\underset{\underset{COOH}{|}}{\overset{CH_2OH}{\underset{|}{C}}}-\underset{}{\overset{H}{\underset{|}{N}}}-CH_2-CH_2-\underset{}{\overset{H}{\underset{|}{N}}}-\underset{\underset{COOH}{|}}{\overset{CH_2OH}{\underset{|}{C}}}-(CHOH)_3-CH_2OH$$

6. The compound of claim 1 having the structural formula:

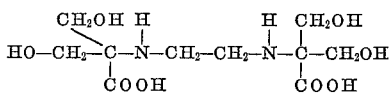

7. The compound of claim 1 having the structural formula:

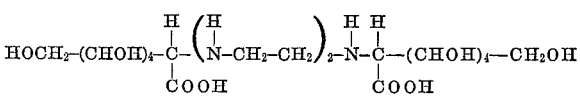

8. Metal chelates of the compounds of claim 1.
9. Iron chelates of the compound of claim 1.
10. Iron chelates of the compound of claim 3.

References Cited
UNITED STATES PATENTS 2,960,762  9/1959  Knell et al. -------- 260—439
3,005,848  10/1961  Knell et al. -------- 260—519

JAMES E. POER, Primary Examiner
A. P. DEMERS, Assistant Examiner

U.S. Cl. X.R.
71—97; 260—211, 429, 438.1, 528, 534